United States Patent [19]
Salomon et al.

[11] 4,430,673
[45] Feb. 7, 1984

[54] PROGRAMMABLE SCAN/READ CIRCUITRY FOR CHARGE COUPLED DEVICE IMAGING DETECTORS

[75] Inventors: Phil M. Salomon, Tujunga; Kalman Smilowitz, Playa del Rey, both of Calif.

[73] Assignee: The United States of America as represented by the Administrator of the National Aeronautics and Space Administration, Washington, D.C.

[21] Appl. No.: 276,749

[22] Filed: Jun. 24, 1981

[51] Int. Cl.³ .............................................. H04N 3/15
[52] U.S. Cl. .................................... 358/213; 358/125
[58] Field of Search ....................... 358/213, 125, 126

[56] References Cited

U.S. PATENT DOCUMENTS

| | | | |
|---|---|---|---|
| 4,012,018 | 3/1977 | Lorell et al. | |
| 4,251,834 | 2/1981 | Hall | 358/213 |
| 4,314,279 | 2/1982 | Yoshida | 358/213 |
| 4,322,752 | 3/1982 | Bixby | 358/213 |
| 4,343,021 | 8/1982 | Frame | 358/213 |
| 4,364,089 | 12/1982 | Woolpson | 358/126 |
| 4,382,267 | 5/1983 | Angle | 358/213 |

OTHER PUBLICATIONS

"Charge-Coupled Device Trackers For High Accuracy Guidance Applications", Salomon, SPIE, vol. 203 (1979), p. 130, originally presented Aug. 27, 1979.
"Image Signal Processing In Sub-Pixel Accuracy Star Trackers", Salomon and Glavich, SPIE, vol. 252 (1981), p. 64, originally presented Jul. 28, 1980.
"Charge-Coupled Device Trackers For High Accuracy Guidance Applications", Salomon, Optical Engineering, Jan./Feb. 1981, vol. 20, No. 1, p. 135.

*Primary Examiner*—Michael A. Masinick
*Attorney, Agent, or Firm*—Paul F. McCaul; Thomas H. Jones; John R. Manning

[57] ABSTRACT

A circuit for scanning and outputting the induced charges in a solid state charge coupled device (CCD) image detector (13) is disclosed in an image detection system (10) for use in a spacecraft attitude control system. The image detection system includes timing control circuitry (25) for selectively controlling the output of the CCD detector (13) so that video outputs are provided only with respect to induced charges corresponding to predetermined sensing element lines of the CCD detector (13). The system also includs an analog to digital converter (29) for converting selected video outputs from the CCD detector (13). The timing control circuit (25) and the analog to digital converter (29) are controlled by a programmed microprocessor (15) which defines the video outputs to be converted and further controls the timing control circuit (25) so that no video outputs are provided during the delay associated with analog to digital conversion.

19 Claims, 6 Drawing Figures

PROGRAMMABLE SCAN/READ CIRCUITRY FOR CHARGE COUPLED DEVICE IMAGING DETECTORS

BACKGROUND OF THE INVENTION

The invention described herein was made in the performance of work under a NASA contract and is subject to the provisions of Section 305 of the National Aeronautics and Space Act of 1958, Public Law 85-568 (72 Stat. 435; 43 U.S.C. 2457).

The disclosed invention relates to the scanning and reading of solid state charge coupled device (CCD) image detectors, and is particularly directed to circuitry for selectively reading only predetermined CCD image sensing elements (pixels) so that read time can be minimized. In the preferred embodiment, the scan/read circuitry is incorporated in a star tracker for spacecraft attitude control systems. An example of the use of a star tracker in a spacecraft attitude control system is set forth in U.S. Pat. No. 4,012,018, issued to Lorell et al. on Mar. 15, 1977.

A solid state CCD image sensor typically includes a rectangular array of discrete light sensing elements which are individually responsive to incident light energy. Particularly, each pixel accumulates an amount of induced charge which is a linear function of the incident illumination intensity and of the time duration of exposure to the incident light (referred to as the "integration period"). Typically, the induced charge packets associated with the pixels would be transferred to one or more analog transport registers for subsequent read-out. Regardless of the number of transport registers used, the analog voltages representative of the respective pixels are outputted serially from the image sensing detector.

Prior art circuitry for scanning and processing the analog voltage outputs of CCD image detectors have typically outputted from the horizontal register each analog voltage associated with the respective CCD image sensing elements. Thus, the charges associated with each horizontal line are transferred to the horizontal register which is serially outputted before the charges of another line are transferred.

Insofar as the analog voltage associated with each sensing element had to be shifted out, scanning the entire CCD array is relatively inefficient particularly where only certain predetermined pixels are of interest, such as in a star tracker.

It is therefore an object of the invention to provide improved scanning, outputting, and selective reading of a CCD image detector.

Another object of the invention is to provide improved control of the video output of a CCD image detector wherein only video outputs corresponding to predetermined pixel-induced charges are A/D converted for further processing.

A further object of the disclosed invention is to provide an improved scan/read circuit for CCD image detectors.

It is another object of the invention to provide a scan/read circuit for CCD image detectors wherein only predetermined pixels are processed.

A further object of the invention is to provide an improved scan/read circuit for CCD image detectors wherein only predetermined analog pixel voltages are outputted from the CCD image sensor.

Yet another object of the invention is to provide an improved scan/read circuit for a CCD image detector wherein only predetermined analog pixel voltages are outputted and wherein only selected ones of such predetermined pixel voltages are A/D converted.

SUMMARY OF THE INVENTION

The foregoing objects and other purposes of the invention are achieved in a CCD image detector system having scan/read circuitry that includes programmable control circuitry that provides control parameters indicative of the pixel locations of interest, timing circuitry responsive to the programmable control circuitry and the control parameters for providing timing signals, video circuitry responsive to the timing signals for driving and clocking the CCD image detector in accordance with the timing signals, and a selectively enabled analog-to-digital (A/D) converter controlled by the programmable control circuitry for A/D converting only those predetermined CCD detector pixel output voltages of interest.

More particularly, the programmable control circuitry includes a programmed microprocessor which controls the clocking, outputting and A/D conversion of analog pixel voltages produced by the CCD image detector. By way of example, the disclosed preferred embodiment is incorporated in a spacecraft attitude control star tracker.

BRIEF DESCRIPTION OF THE DRAWINGS

The advantages and features of the present invention can be readily understood and appreciated by persons skilled in the pertinent art from the following detailed disclosure when read in conjunction with the drawing wherein.

DETAILED DESCRIPTION OF THE DISCLOSURE

Figure 1:
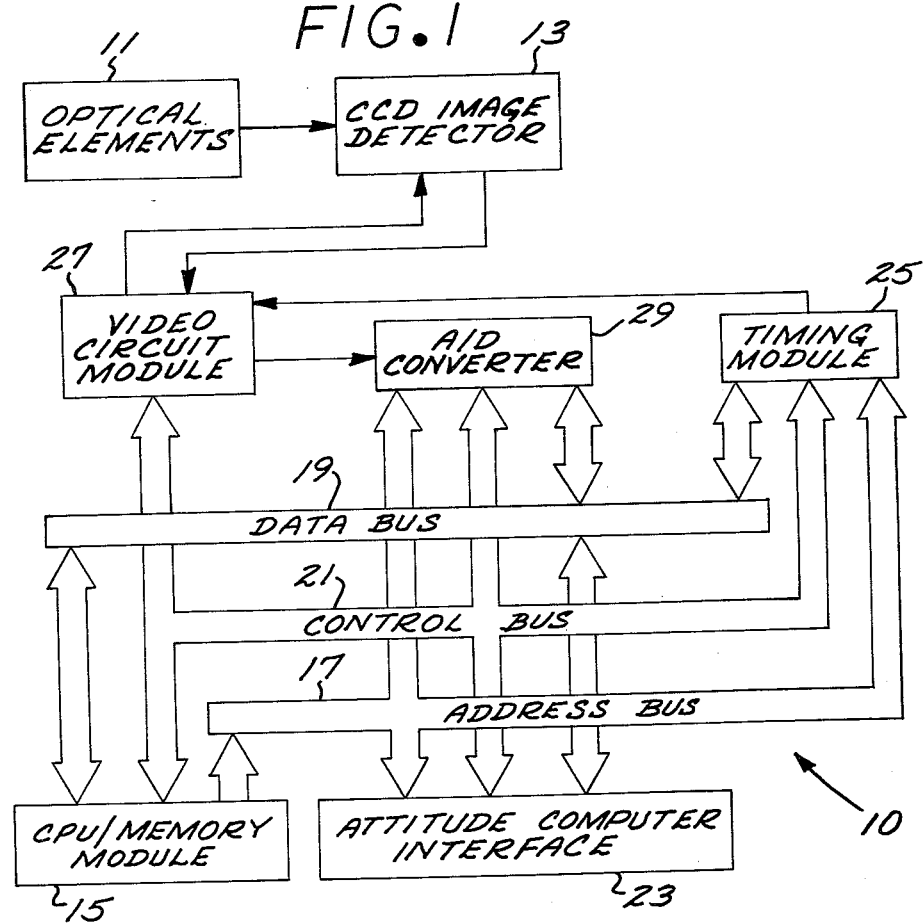
FIG. 1 is an illustrative block diagram of the disclosed charge coupled device (CCD) image detector system that incorporates the invention.

Illustrated in FIG. 1 is a CCD image detector system 10 that includes a group of optical elements 11 which provides image forming charge inducing incident light to a CCD image detector 13. The optical group 11 should typically include lens elements and other optical elements. For purposes of star tracking, where the focused image of a star of interest might be smaller than the non-sensing boundaries between the individual light sensing elements of the CCD image detector 13, the optical image should be slightly defocused. That will insure that the image of a star of interest will always be sensed by the light sensing elements.

The overall operation of the CCD image detector 10 is controlled by a central processing unit (CPU)/memory module 15. As shown, there are functional elements interposed between the CCD image detector 13 and the CPU/memory module 15 and such elements will be described further herein.

The CPU/memory module 15 preferably utilizes a commercially available microprocessor of appropriate processing speed for the particular application. For the disclosed star tracker use of the CCD image detector system 10, the Intel 8080 microprocessor is suitable. The CPU/memory module 15 further includes random access memory (RAM) and read only memory (ROM) which are not shown. Also, the CPU/memory module 15 includes appropriate interface and control circuitry, as required, such as a clock generator and driver. The specific implementation of the CPU/memory module 15 will depend on many factors including the microprocessor used, and specific implementations will be readily apparent to persons skilled in the art.

Associated with the CPU/memory module 15 is an address bus 17 and a data bus 19 for addressing other functional elements in the CCD detector system 10 and for communication between the CPU/memory module 15 and such other elements. Also, a control bus 21 is provided for the communications of control information (such as read or write commands). Power supply connections and other well known details of microprocessor based systems are not shown.

The CCD detector system 10 further includes an attitude computer interface 23 for communicating with the attitude computer (not shown) that utilizes the disclosed detector system 10. Thus, commands from the attitude computer are communicated via the interface 23, and position information regarding the star or stars being tracked is provided to the attitude computer via the interface 23. As is shown, the interface 23 is coupled to the address bus 17 and the data bus 19.

The CPU/memory module 15 further controls a timing module 25 which provides the clock and control signals for outputting the integrated charge patterns of the CCD image detector 13. As will be more fully described below, the timing module 25 selectively controls, inter alia, the rate of transfer of the line charges to the horizontal shift register of the CCD detector 13 and whether the horizontal shift register outputs its charge packets. The clock rate of the output of the horizontal transport register is also controlled by the timing module 25.

The outputs of the timing module 25 are provided to a video circuit module 27 which contains appropriate driver circuitry for driving the CCD image detector 13. The video circuit module 27 further includes a preamplifier for the video output of the CCD horizontal register, and circuitry for sampling the pre-amplified signal. Video circuitry for driving and sampling CCD image detectors are known to persons skilled in the art.

The sampled outputs from the video circuit module 27 are provided to an analog-to-digital (A/D) converter 29. Communication between A/D converter 29 and the CPU/memory module 15 is via the address bus 17, the data bus 19, and the control bus 21. In accordance with the principles of the disclosed invention, the A/D converter 29 operates only on those CCD video output samples that are of interest as defined by the CPU/memory module 15. The A/D results are communicated to the CPU/memory module 15 as data on the data bus 19.

Figure 2:
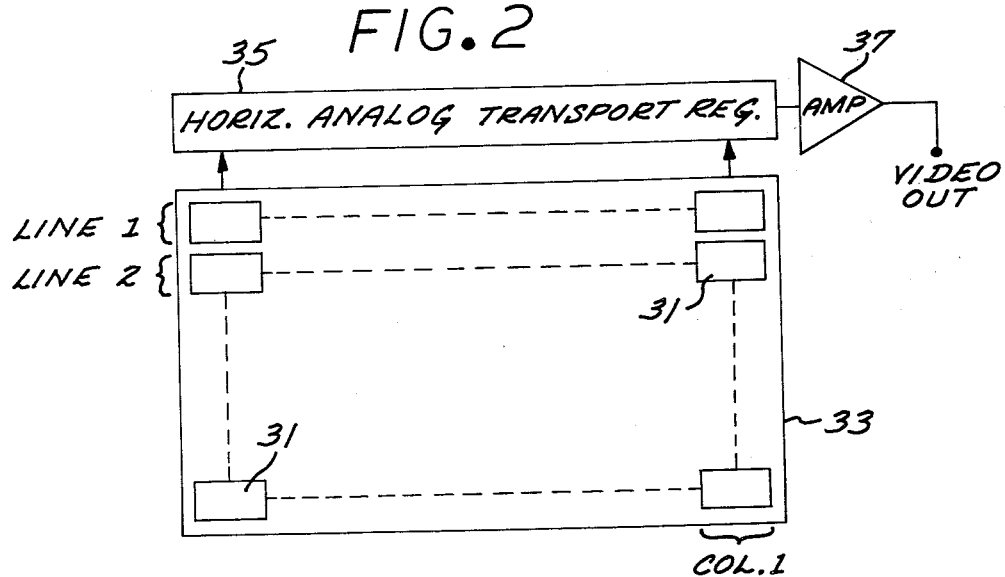
FIG. 2 is a simplified block diagram of an exemplary CCD image detector.

By way of example, the CCD image detector 13 can be one of the suitable commercially available detectors such as those available from RCA or FAIRCHILD. For ease of explanation, a simplified block diagram of a typical CCD image detector chip is shown in FIG. 2. As discussed previously, a typical CCD image detector includes discrete light-sensing elements 31 called pixels which are distributed in a rectangular grid 33, as shown on FIG. 2. The elements forming a row in the array 33 are sometimes collectively referred to as a line or horizontal line. The elements forming a column are sometimes collectively referred to as a vertical column. As is well known to persons skilled in the art, each pixel 31 develops an induced charge packet having a charge level that is proportional to incident light intensity and duration of exposure to incident light prior to transfer of the charge packet. The duration of exposure is also referred to as the integration period.

The integrated charges are clock outputted, and the integrated charges associated with an individual horizontal line are ultimately transferred to a horizontal transport register 35 which is shown in FIG. 2. An onchip amplifier 37 provides the video output from the CCD detector.

By way of reference, a field can be considered as a collection of horizontal lines, and the field is sequentially clocked into the horizontal transport register 35 line by line. Some CCD devices define all of the horizontal lines as one field (often referred to as a "frame"), while others define the odd horizontal lines as one field and the even horizontal lines as another, wherein both fields comprise the frame. In either case, after an integration period the charges of the entire CCD array are transferred to the horizontal transport register one line at a time as controlled by appropriate clocking. Obviously, where the entire array is divided into two fields, the charges associated with the lines of one field (for example, the odd lines) are sequentially transferred, on a line-by-line basis to the horizontal transport register, and then the charges associated with the other field (in the same example, the even lines) are transferred to the horizontal transport register line by line.

Where two fields are used to output the integrated charges of the entire array, generally the CCD image detector chip includes vertical transport registers (not shown on FIG. 2), with one vertical transport register for each vertical column of image sensing elements. In operation, at the end of the integration period, all the charges of the lines corresponding to the first field are transferred to the vertical transport registers. Then, the charges on the vertical registers are transferred one line at a time to the horizontal register. After all the charges of the lines of the first field have been transferred, the charges corresponding to the other field are transferred to the vertical transport registers for line by line transfer to the horizontal transport register.

In those CCD detector devices wherein contiguous horizontal lines are sequentially transferred to the horizontal transport register, vertical transport registers are not used. Rather, the contents of each line is transferred to the adjacent line closer to the transport register upon appropriate vertical clock signals. Thus, the charges of respective lines are transported to the horizontal transport register on a line by line basis.

It should be noted that the horizontal register of the CCD image detector 13 is not cleared unless it is transferred out by appropriate clocking. Thus, transferring the charges for a line into the horizontal transport register without having serially outputted the charges from the previous line will result in charge accumulation, and the information corresponding to those lines whose charges were accumulated is lost. That, however, does not matter where the information associated with the charges of such accumulated lines is of no interest.

The CCD detector 13 is a clocked device requiring vertical shift clock signals to transfer the line charges to the horizontal shift registers. On each vertical shift clock, each line being transferred advances one line and the line adjacent the horizontal transport register 35 transfers into the horizontal transport register 35. The CCD detector further requires horizontal shift clocks for outputting the contents of the horizontal transport register. Specifically, the video output of a new charge packet is provided with a new horizontal shift clock.

It should be noted that in referring to vertical and horizontal shift clocks, persons skilled in the art will readily recognize that a CCD image detector will generally include multiple inputs for multi-phase clock signals. The details of the multi-phase clocking requirements of CCD image detectors are well known to persons skilled in the art.

In the disclosed invention, the vertical shift clock (VCLOCK) is of a fixed period and is provided only after the horizontal transport register is fully shifted out or only when the horizontal shift register is not to be outputted. Thus, where no horizontal shift clocks are applied, VCLOCK is continually applied. Otherwise, VCLOCK is controlled so that it does not occur until after the horizontal clocks have ceased.

The horizontal clocks (generally called HCLOCK herein) are of variable periodicity. A fast HCLOCK called HCLOCK1 is utilized in shifting charges associated with image sensing elements outside a predetermined area of the CCD array called the field of view (FOV). Within the field of view, a slower HCLOCK called HCLOCK2 is utilized.

The field of view (FOV) referred to depends on the mode of operation of the detector system 10. By way of example, the disclosed invention is contemplated to include a target acquisition mode and a track mode. In the acquisition mode the FOV is 1°×10° wherein the 1° dimension is in the horizontal line direction. In the track mode, the FOV is 10°×10°. Both of these fields of view are considerably smaller than the entire field of view of the CCD detector 13 and will be discussed more fully below.

Insofar as timing control of the CCD detector 13 is important to the operation of the disclosed detector system 10, the following definitions in the context of timing are provided for a better understanding of the invention.

SCAN. As used with regard to the CCD detector 13, this term refers to the line by line transfer of charge packets into the horizontal transport register, regardless of whether the horizontal transport register is clocked. Thus, the overall operation of selectively clocking the CCD detector to ultimately clear all the pixels will be called scanning.

READ. As used in conjunction with the video output from the amplifier 37, reading that output will refer to the sampling and A/D conversion of a particular video output from the amplifier 37. Thus, the horizontal transport register can be clocked, thereby providing video outputs, but such outputs are not necessarily read. When a video output is read, the horizontal shift clock signals (which will necessarily be the slower HCLOCK2) are not furnished to the CCD detector 13 until A/D conversion is complete. This insures that subsequent charge packet data is not lost.

HORIZONTAL ACCUMULATE MODE. In this mode of operation, charges associated with a horizontal line are transferred to the horizontal shift register without serially outputting the horizontal register contents from the previous horizontal line(s). VCLOCK is continually applied without any intervening HCLOCK, and information corresponding to horizontal lines thus accumulated is lost.

SERIAL DUMP MODE. In this mode of operation, the entire contents of the horizontal transport register is clocked out but not read (i.e. without A/D conversion) by application of the horizontal shift clock HCLOCK prior to transfer into the horizontal register of the charges of a subsequent line. The faster HCLOCK1 is utilized to shift out charges corresponding to those elements which are not within the controlling field of view and the slower HCLOCK2 is used to shift out charges corresponding to image detecting elements within the field of view. The vertical shift clock VCLOCK is not applied until after the horizontal transport register has been completely shifted out, and thus the horizontal transport register is cleared prior to transfer into the horizontal register of the charges of a subsequent line.

SELECTIVE READ MODE. In this mode of operation, the horizontal transport register is clocked with the appropriate horizontal shift clocks HCLOCK1 and HCLOCK2. When a video output is to be read, such an output is sampled and provided to the A/D converter, and the horizontal register is not clocked until that A/D conversion is completed. The A/D conversion delay is considerably longer than either of the horiziontal shift clock periods, and therefore charges associated with pixels not to be read can be outputted as fast as practicable since they do not have to be A/D converted.

Thus, the disclosed invention minimizes the time required to scan the CCD detector 13 through the control of the clocks applied. The image areas of interest are processed as required, while those areas not of interest are scanned expeditiously.

Figure 3:
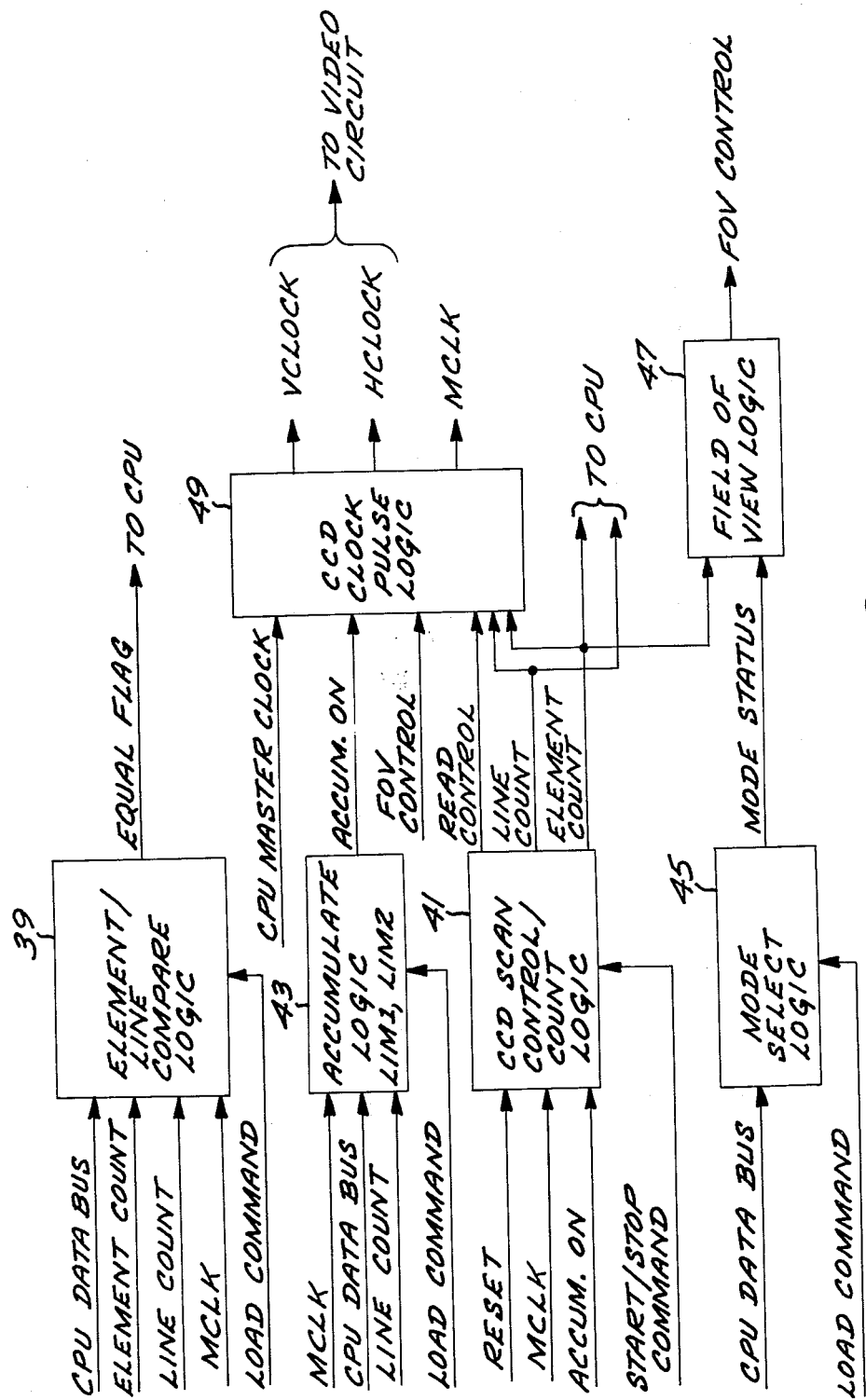
FIG. 3 is a schematic diagram of the elements of the timing module identified in FIG. 1.

Referring now to FIG. 3, illustrated therein is a block diagram of the timing module 25 of FIG. 1. Well known details such as input and output decoders, data bus buffers, and control lines are not shown. The timing module of FIG. 3 includes an element/line compare logic 39 which compares the element count (ECOUNT) and line count (LCOUNT) of the current video output of the horizontal transport register of the CCD detector 13 (FIG. 1) with position data provided by the CPU/memory module 15. The position data from the CPU is loaded via the CPU data bus 19 upon an appropriate load data command. A CCD master clock MCLK, which is derived from the CPU master clock, is also provided to the element/line compare logic 39. The compare logic 39 provides an Equal Flag output that is active when the current video output coincides with the position data. The Equal Flag output is utilized by the CPU/memory module 15 to stop the CCD clocks to allow for A/D conversion.

The line count and element count signals are provided by scan control/count logic 41. The line count and element count are indicative of the CCD image element position associated with the video output from the horizontal transport register. As indicated, the element count and line count are also provided to the CPU/memory module 15. The CCD scan control/count logic 41 also provides read control information.

Inputs to CCD scan control/count logic 41 include a reset signal to synchronize the count logic to output of the CCD detector 13, and the CCD master clock MCLK. Further, an Accumulate On signal is provided to the scan control/count logic 41 that indicates when the horizontal accumulate mode is on, thereby preventing erroneous element counts.

The CPU/memory logic 15 further provides start/stop commands to the scan control/count logic 41 to indicate when the video output of the horizontal transport register is to be read (that is, A/D converted), and when the counting process should stop. The start/stop information is also provided in the read control information outputted by the CCD scan control/count logic 41.

The Accumulate On signal is outputted by an accumulate logic circuit 43 which compares the line count with CPU provided line limits LIM1 and LIM2. The first limit LIM1 indicates that all lines prior to line LIM1 are to be transferred to the horizontal register in the horizontal accumulate mode. The other limit LIM2 indicates that line LIM2 and succeeding lines are to be transferred to the horizontal transport register in the horizontal accumulate mode. During those intervals when the horizontal accumulate mode is utilized, the Accumulate On signal is active, thereby indicating that the horizontal clock HCLOCK should not be supplied to the CCD detector 13.

The line limits LIM1 and LIM2 are provided to the accumulate logic 43 from the CPU/memory module 15 via the CPU data bus 19. That data is transferred in response to an appropriate load command from the CPU/memory module 15.

The timing module of FIG. 3 further includes mode select logic 45 which provides as an output mode status information indicative of the mode of operation of the image detector system 10 (e.g., target acquisition or track mode.) The mode of operation data is inputted from the CPU/memory module 15 to the mode select logic 45 via the CPU data bus 19 on an appropriate load command.

The mode status information is provided to field of view (FOV) logic 47 which is also responsive to the element count from the CCD scan control/count logic 41. The FOV logic provides FOV control information that indicates whether the element count is within the element count parameters of the particular FOV defined by the mode status.

The FOV status (based on element count) is provided to CCD clock pulse logic 49 which also accepts the Accumulate On signal from the accumulate logic 43. Other inputs to the CCD clock pulse logic 49 include the read control information, the line count, and the element count from the CCD scan control/count logic 41. The CPU master clock is also inputted to the CCD clock pulse logic 49.

On the basis of inputs it receives, the CCD clock pulse logic 49 provides the vertical shift clock VCLOCK and the horizontal shift clock HCLOCK to the video circuitry 27. It also provides the CCD master clock MCLK which is synchronized to the CPU master clock. Thus, appropriate VCLOCK's and fast or slow HCLOCK's are provided. Moreover, in response to the start/stop command from the CPU to the CCD scan control/count logic 41, the CCD clock pulse logic 49 is provided with read information indicating that A/D conversion is to be performed and the clock signals to the CCD detector 13 should be stopped.

Further, the Accumulate On signal and the FOV status provide the CCD clock pulse logic 49 with information to provide HCLOCK1 and HCLOCK2 at the appropriate element and line counts. That is, the horizontal shift clock HCLOCK is applied between lines LIM1 and LIM2, and the appropriate clock rate HCLOCK1 and HCLOCK2 is utilized depending on the element count.

Figure 4:
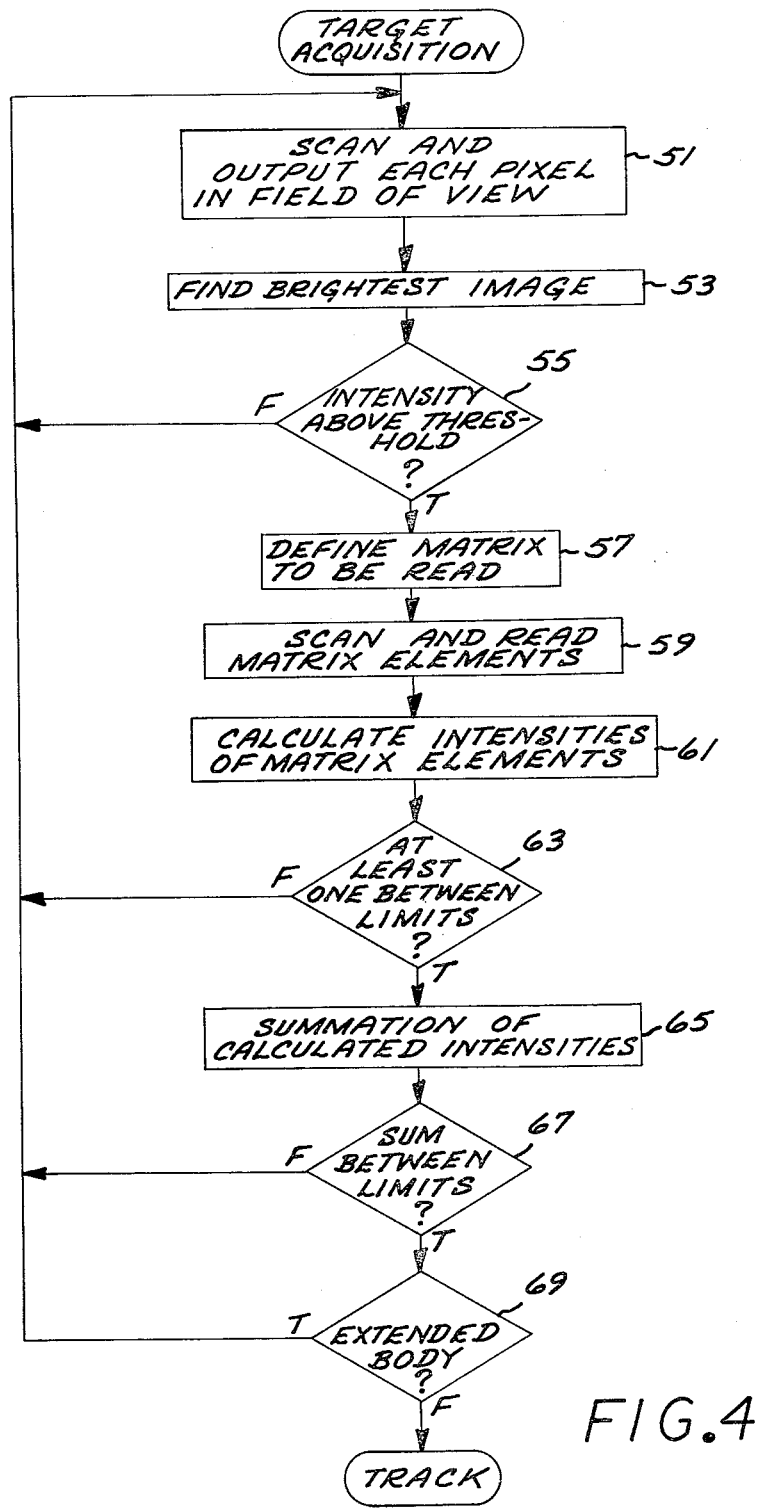
FIG. 4 through FIG. 6 illustrate flow charts that disclose the functions performed by the CPU/memory module shown in FIG. 1 and the timing module shown in FIG. 2.

Referring now to FIG. 4, illustrated therein is a flowchart defining the functions performed by the CCD image detector 13 in the target acquisition mode. In that mode, the field of view in terms of element count is defined by the FOV logic 47 in response to the mode status. The field of view in terms of line count is defined by the accumulate logic 43 in response to LIM1 and LIM2 as provided by the CPU/memory logic 15. Thus, the charges associated with the lines within the field of view are outputted, and the charges associated with elements within the field of view are outputted using the slower HCLOCK2. As shown by the function blocks 51 and 53 in FIG. 4, video outputs are provided for each of the charges associated with the CCD elements in the field of view, and the element having the brightest image is determined.

A decision is made in a decision block 55 as to whether the image intensity in that brightest element exceeds a predetermined analog threshold. If it does not, then the CCD detector array is again scanned. If the image intensity exceeds the predetermined threshold, information regarding the location of the element having the brightest image intensity is utilized to define an acquisition matrix of CCD elements to be read (i.e., A/D converted) as shown by function block 57. In a star tracker system, that matrix would typically comprise a six by six element array.

On the basis of that matrix, the CCD detector 13 is scanned, and the video outputs associated with the defined matrix are A/D converted as shown in the function block 59. The digital values representing the induced charges from the matrix elements are then utilized to calculate individual pixel intensities, as identified in the function block 61.

The calculated intensities are then compared with predetermined high and low intensity limits, as shown in the decision block 63. If none of the calculated intensities is between the predetermined limits, the detector system function returns to scanning the field of view for a target at the function block 51. If at least one of the calculated intensities is between the predetermined limits, then the calculated intensities are summed, as shown in the function block 65.

The intensity sum is then compared with predetermined high and low total intensity limits, as shown in decision block 67. If the total intensity is not between the predetermined limits, then the detector system returns to scanning for another target beginning with the function block 51. If the total intensity is between the predetermined limits, then the matrix that was read, as represented by the individual calculated intensities, is analyzed to determine whether the image is an extended body. An extended body is an image that extends over more elements of the matrix than would be expected of a star, which would typically be defocused over a three by three matrix.

As shown in decision block 69, if the image on the matrix is determined to be an extended body, then the image detector system returns to scanning for another target, starting at the function block 51. If the image is not an extended body, then it is regarded as an appropriate target star for tracking.

Figure 5:
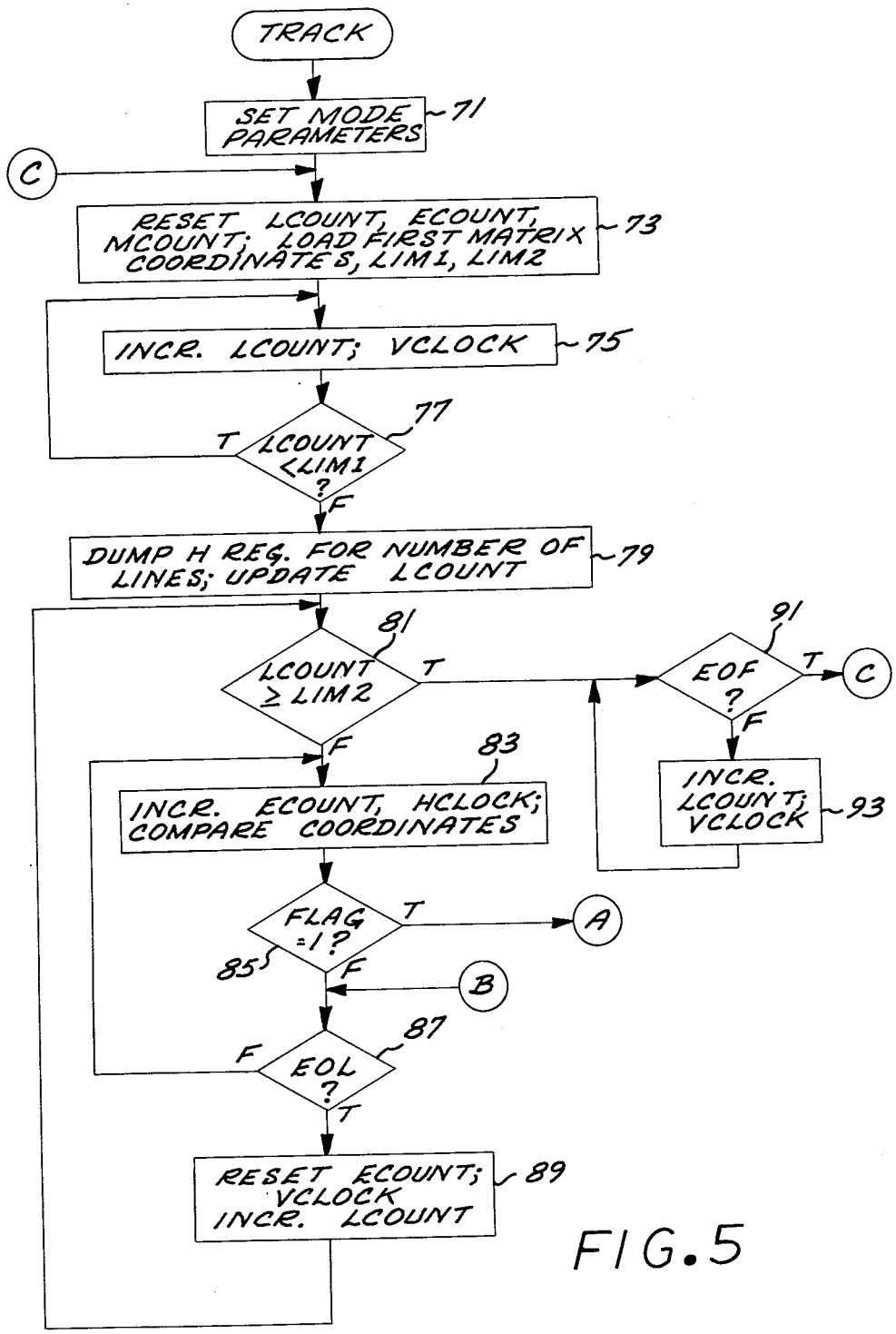
Figure 6:
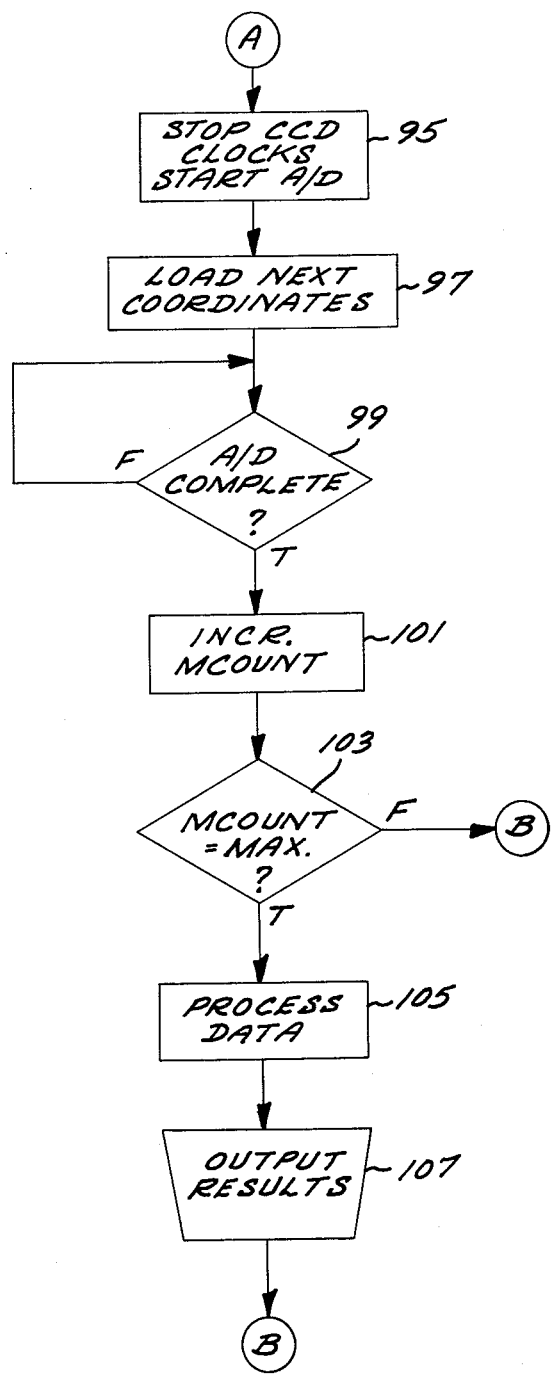

The functions performed by the detector system in the track mode are set forth in the flowcharts of FIGS. 5 and 6. In that mode of operation the matrix of interest within the appropriate field of view can be a three by three element tracking matrix that is determined from the intensity information derived in the acquisition mode. Further, although the tracking matrix can be anywhere within the 10°×10° tracking field of view, the line count limit LIM1 is set as a function of the tracking matrix so that the charges associated with a predetermined number of lines immediately prior to the first line that has an element of the tracking matrix are serially dumped (i.e., those lines are clocked out of the horizontal register but not A/D converted). Also, LIM2 is set so that horizontal line accumulation resumes after the last line containing a matrix element has been read out. Thus, for purposes of horizontal line accumulation, the matrix location is controlling.

Referring to FIG. 5, the mode parameters are set upon entry into the tracking mode, as shown by the functional block 71. Thus, for example, the FOV logic 47 (FIG. 3) will provide appropriate field of view ciontrol in response to the mode status. In the next function block 73, the line count LCOUNT, element count ECOUNT, and matrix count MCOUNT are reset. The line count and element count are provided by the CCD scan control/count logic 41, and the matrix count MCOUNT represents the number of tracking matrix elements that have to be A/D converted.

Further in accordance with the function block 73, the line count and element count of the first element of the tracking matrix are loaded by the CPU/memory module 15 into the element/line compare logic 39; and the horizontal accumulate limits LIM1 and LIM2 are loaded into the accumulate logic 43.

As shown in function blocks 75 and 77, there is a loop which increments LCOUNT, provides an appropriate VCLOCK to shift one line into the horizontal register, and checks whether LCOUNT is less than LIM1. So long as LCOUNT remains less than LIM1, the loop continues, thereby causing the CCD detector system to operate in the horizontal accumulate mode.

When LCOUNT is no longer less than LIM1, the functions set forth in function block 79 are performed which includes serially dumping a predetermined number of lines and appropriately incrementing LCOUNT. The lines serially dumped correspond to a predetermined number of lines immediately prior to the line having the first tracking matrix element.

The LCOUNT is examined to determine whether it is greater than or equal to LIM2, as represented by decision block 81. If LCOUNT is less than LIM2, then the functions set forth in function block 83 are performed. That is, ECOUNT is incremented and the appropriate HCLOCK is applied to output an analog charge from the horizontal transport register. The position coordinates associated with the output, as represented by LCOUNT and ECOUNT, are compared with the coordinates identifying the next matrix element to be read. When the comparison determines that the respective coordinates are equal, the Equal Flag is set to one.

In the next decision block 85, the Equal Flag is checked, and if it is a one, a branch to the routine A of FIG. 6 is made. If the flag is not set, then a determination is made as to whether the outputted charge corresponds to the last element of a line thereby indicating the end of line (EOL), as identified by decision block 87.

If the end of line has not been reached, control loops back to the function block 83. When the end of line is reached, the functions set forth in function block 89 are performed. The element count ECOUNT is reset, an appropriate VCLOCK is provided to transfer the next line into the horizontal transport register, and LCOUNT is incremented.

Control then transfers back to the decision block 81 to determine whether LCOUNT has reached LIM2. As contemplated, LIM2 corresponds to the line immediately after the line having the last element in the tracking matrix. The functions performed when LCOUNT has not reached LIM2 have been discussed above.

When LCOUNT reaches LIM2, a determination is made as to whether the end of frame (EOF) has been reached, as specified in decision block 91. If the end of frame has not been reached, the functions of function block 93 are performed, and thus LCOUNT is incremented and an appropriate VCLOCK is provided to shift a line into the horizontal shift register. Then control goes back to the decision block 91.

If the end of frame is reached, as determined by the decision block 91, the entire CCD detector 13 has been scanned. Therefore, control returns to the function block 73 as indicated by the letter "C" to start the track scanning procedure all over again. Thus, all lines following the lines containing the tracking matrix are horizontally accumulated, and HCLOCK is not provided.

In the course of scanning the CCD detector array 13, the Equal Flag examined in the decision block 85 will be set (one) with respect to the video output of those elements in the tracking matrix. At those times, control is transferred to a routine A which is set forth in FIG. 6, which includes a function block 95 that defines that clocks are not provided to the CCD detector array 13 and A/D conversion starts. According to the next function block 97, the coordinates of the next element whose video output is to be read are loaded into the element/line compare logic 39 for subsequent use.

Then a continual check is made to determine whether A/D conversion is completed, as shown by the loop that includes decision block 99. When A/D conversion is complete, the matrix count MCOUNT is incremented as shown in function block 101 to include the video output that was just A/D converted. In decision block 103, a determination is made as to whether MCOUNT has reached a predetermined maximum that corresponds to the number of elements in the predetermined tracking matrix. If the maximum has not been reached, control returns to the point B on FIG. 5.

If the maximum count has been reached (indicating the entire tracking matrix has been read), the intensity data corresponding to the tracking matrix is processed as represented by the function block 105. Such processing could include interpolation to determine the centroid of the tracked start image and the calculation of attitude errors. The processing results are outputted via the attitude computer interface 23 (FIG. 1) as represented by function block 107. Control then returns to the point B on FIG. 5.

Although the foregoing has been a description and illustration of specific embodiments of the invention, various modifications and changes thereto can be made by persons skilled in the art within the scope and spirit of the invention as defined by the following claims.

What is claimed is:

1. In an image detector system including charge coupled device (CCD) image detecting means responsive to image forming incident light and having a plurality of lines of individual light sensing elements for storing induced charges and a horizontal transport register, the improved combination comprising:

sensing means responsive to a predetermined control parameter in a sensed area less than the overall area of the entire device;

timing control means for controlling the transfer of the line charges into the horizontal register and for controlling the CCD image detecting means to provide video outputs only for predetermined line charges from said sensed area; and processing means for providing to said timing means control information indicative of said predetermined lines.

2. The combination of claim 1 wherein said timing means provides clock signals for shifting the horizontal transport register only after the transfer into the horizontal register of any of said predetermined lines.

3. The combination of claim 2 wherein said timing means controls the clock rate provided to the horizontal register as a function of the position in the line of the charge being outputted.

4. The combination of claim 3 wherein said timing means controls the provision of the clock signals provided to the horizontal register in response to commands from said processing means.

5. The combination of claim 1 wherein said processing means is a programmable microprocessor.

6. The combination of claim 5 wherein said microprocessor defines a plurality of adjacent lines as said predetermined lines.

7. In an image detector system including optical means for providing image forming light energy, and charge coupled device (CCD) image detecting means responsive to the light energy having a plurality of image detecting elements arranged in horizontal lines and vertical columns for individually integrating respective charges over an integration period in response to the light energy and further having a horizontal analog transport register, the improved combination comprising:

timing control means for controlling the transfer of line charges into the horizontal transport register and for selectively controlling the video output from the horizontal register;

circuitry for sampling the video output of the horizontal transport register to provide analog sample outputs;

conversion means for accepting selected analog sample outputs and for providing digital outputs representative of said selected analog sample outputs;

means for sensing a predetermined area of interest in the CCD which area is smaller in dimension than the entire CCD area; and processing means for providing to said timing control means and said conversion means control information indicative of predetermined image detecting elements associated with the area of interest and whose integrated charges are to be outputted and converted by said conversion means.

8. The combination of claim 7 wherein said timing control means controls the CCD image detecting means to provide video outputs only for line charges corresponding to predetermined horizontal lines.

9. The combination of claim 8 wherein said predetermined horizontal lines include said predetermined image detecting elements and a plurality of adjacent lines whose integrated charges are transferred to the horizontal register prior to the transfer to the horizontal register of charges corresponding to lines containing predetermined image detecting elements.

10. The combination of claim 8 wherein said timing control means provides horizontal shift clock signals for providing the video outputs from the horizontal transport register.

11. The combination of claim 10 wherein said horizontal shift clock signals are at different rates as a function of the vertical column position of the element associated with the charge providing the video output.

12. The combination of claim 7 wherein said processing means comprises a programmable microprocessor that further operates on said digital outputs to provide image information.

13. A circuit for scanning and selectively outputting the light energy induced charges of a charge coupled device (CCD) image detector comprising:

timing control means for selectively controlling the clocking of the CCD image detector as a function of the regions of the CCD image detector being scanned so that predetermined regions are clocked in accordance with predetermined clocking sequences;

sensing means for sensing a predetermined region less than the entire region after determining that said sensed region meets a predetermined control parameter; and processing control means for providing control information to said timing means including information indicative of said predetermined region that met said control parameter.

14. The circuit of claim 13 wherein said timing control means controls the CCD image detector to provide outputs only for predetermined lines which are fewer than all of the lines in the CCD image detector.

15. The circuit of claim 14 wherein said timing control means provides horizontal shift clock signals to the CCD image detector for producing video outputs corresponding to the charges associated with said predetermined lines.

16. The circuit of claim 15 wherein said horizontal shift clock signals are provided at different rates as a function of the position in the line of the charge being outputted.

17. The circuit of claim 15 further including an analog to digital converter for converting selected video outputs as determined by said processing control means.

18. The circuit of claim 13 wherein said processing control means comprises a programmable microprocessor.

19. A circuit for scanning and selectively reading out a charge coupled device (CCD) including:

means operative for determining if a predetermined portion less than the entire CCD meets a predetermined control parameter; and timing control processing means for reading only that portion of the CCD which meets said control parameter.

* * * * *